UNITED STATES PATENT OFFICE.

THOMAS J. MAYALL, OF BOSTON, MASSACHUSETTS.

IMPROVEMENT IN RUBBER AND PLUMBAGO COMPOUNDS FOR BEARINGS AND OTHER PURPOSES.

Specification forming part of Letters Patent No. 140,208, dated June 24, 1873; application filed June 14, 1873.

*To all whom it may concern:*

Be it known that I, THOMAS J. MAYALL, of Boston, Suffolk county, Massachusetts, have invented a certain new and useful Rubber and Plumbago Compound for various uses in the arts, of which the following is a specification:

The rubber and plumbago compound, in which my invention is comprised, is produced as follows: The main ingredients, and indeed the only necessary ingredients, are plumbago or black lead, rubber and sulphur. These I take in the following proportions: Washed or prepared rubber, 100 pounds; sulphur 50 pounds; plumbago or black lead, 200 to 250 pounds. These ingredients, in the proportions specified, are ground and thoroughly mixed together in a heater in the manner ordinarily practiced in preparing vulcanizable-rubber compounds. The mass thus obtained is run into sheets or made up into tubes, or molded into any desired form.

In vulcanizing this compound I much prefer the water process. That is to say, in the case of sheets, I place them between sheets of tin-foil as in curing hard-rubber sheets, pack them in an iron box filled with water, and then apply heat. The tubing is placed on a mandrel and wrapped with cloth or tin-foil, and then cured in water like the sheets. I can, however, cover the tubes or sheets with soapstone or pounce, and then vulcanize; or I can cure them in open steam heat or dry heat.

In order to bring the compound to proper vulcanized condition for the purposes I have in view, I subject it in the curing or vulcanizing oven or heater to a heat of from 312° to 318° Fahrenheit, which is continued for from seven to eight hours. This heating, both in degree and duration, is considerably greater than that to which ordinary hard rubber is subjected, and is more than such ordinary hard-rubber compound can endure. For instance, a sheet of said ordinary hard-rubber compound, say an eighth of an inch thick, would, if subjected to such a heat for the length of time specified, be "over-cured" and ruined. A thicker sheet of the same compound, say from an inch to an inch and a quarter thick, subjected to a like heat for the same length of time, would become "blown", and pitted with holes. Both sheets would be too brittle to be of any use as hard rubber; but, on the contrary, a sheet of the compound I employ, whether an eighth of an inch thick or one and a quarter inch thick, would, at the heat specified, continued during the time specified, become thoroughly cured, the result being a metal-like product, hard and tough, and of great durability, possessing some of the characteristics of lead, and some of the characteristics of hard rubber, yet not to be mistaken for either.

This product is of special value for anti-friction bearings for shafting, pulleys, wheels, and other like purposes, where a good bearing surface is required for a revolving body. It is non-heating and wears very slowly, being extremely resistant and durable. Journal-boxes lined with it require little or no oil, as it indeed takes the place of and renders unnecessary a lubricant in most cases. It can also, like metal, be turned into a variety of forms. It will be found useful for making small gears, and even tool-handles. Journal-boxes can be made entirely of it by molding it into proper form preliminarily to the vulcanizing operation.

In making tool-handles I prefer, in order to prevent the article from smutting, to mix with the ingredients above named a small quantity of whiting, say from two to four pounds of whiting to sixteen pounds of plumbago.

The product is also extremely useful for making carpenters' pencils. It may be formed into sticks or cylinders for the purpose. And when designed for an article of this kind the quantity of plumbago may be somewhat augmented.

The formula first above given, however, is that which is the one fitted for the production of anti-friction bearings, and any alterations in or departure from it will produce an article inferior for the purpose.

This product can also be used for type and stereotype plates. It will be found valuable also for nuts to receive the screws of carpenter-bench vices and like articles; also for furniture castors, sockets, &c., and for many other purposes in the industrial arts.

A product bearing a superficial resemblance to the one made, as above described, can be obtained by taking the compound prepared as above stated, and subjecting it to a lower heat, say from 275° to 300°, for from sixteen to twenty-four hours; but such product is inferior in every respect to the one made by me, being softer, crumbly, liable to heat, and without durability.

I have described what I consider to be the best method of carying my invention into effect, but it is manifest that the same may be varied to some extent without departure from my invention, and that other ingredients might be added to those herein named without essentially affecting the character of the product.

I wish it to be understood, in conclusion, that I do not claim to be the first to have combined plumbago with a hard-rubber compound. I am aware that this has been done before.

What I do claim, and desire to secure by Letters Patent, is—

1. The process of making the herein described rubber and plumbago compound for anti-friction bearings, and for other purposes, the same consisting in first mixing together plumbago, rubber, and sulphur as the main ingredients, in the proportions herein stated, then molding the same; or forming it into sheets or sticks or tubes, and then subjecting the same to a heat ranging between the temperatures stated for the time specified.

2. The rubber and plumbago compound produced in the manner and by the process herein described.

In testimony whereof I have hereunto signed my name in the presence of two subscribing witnesses.

THOS. J. MAYALL.

Witnesses:
JOHN BULKLEY,
EDM. F. BROWN.